US012703771B2

(12) United States Patent
Goetz et al.

(10) Patent No.: US 12,703,771 B2
(45) Date of Patent: Aug. 11, 2026

(54) BUILD MATERIALS FOR ADDITIVE MANUFACTURING APPLICATIONS

(71) Applicant: Eastman Chemical Company, Kingsport, TN (US)

(72) Inventors: James Thomas Goetz, Kingsport, TN (US); Andrew Thomas Detwiler, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 774 days.

(21) Appl. No.: 17/597,442

(22) PCT Filed: Jul. 8, 2020

(86) PCT No.: PCT/US2020/041100
§ 371 (c)(1),
(2) Date: Jan. 6, 2022

(87) PCT Pub. No.: WO2021/007268
PCT Pub. Date: Jan. 14, 2021

(65) Prior Publication Data

US 2022/0169785 A1 Jun. 2, 2022

Related U.S. Application Data

(60) Provisional application No. 62/871,425, filed on Jul. 8, 2019.

(51) Int. Cl.

| | |
|---|---|
| ***C08G 63/88*** | (2006.01) |
| ***B29C 64/153*** | (2017.01) |
| ***B29K 67/00*** | (2006.01) |
| ***B33Y 10/00*** | (2015.01) |
| ***B33Y 70/00*** | (2020.01) |
| ***B33Y 70/10*** | (2020.01) |

(52) U.S. Cl.
CPC ............ *C08G 63/88* (2013.01); *B29C 64/153* (2017.08); *B33Y 70/00* (2014.12); *B33Y 70/10* (2020.01); *B29K 2067/00* (2013.01); *B33Y 10/00* (2014.12)

(58) Field of Classification Search
CPC ....... C08G 63/88; B29C 64/153; B33Y 70/10; B33Y 10/00; B33Y 70/00; B29K 2067/00
See application file for complete search history.

(56) References Cited

U.S. PATENT DOCUMENTS

| | | | |
|---|---|---|---|
| 5,990,268 | A | 11/1999 | Dickens, Jr. et al. |
| 6,100,411 | A | 8/2000 | Ojima |
| 7,906,063 | B2 | 3/2011 | Monsheimer et al. |
| 8,114,334 | B2 | 2/2012 | Martinoni et al. |
| 8,592,519 | B2 | 11/2013 | Martinoni |
| 9,561,625 | B2 | 2/2017 | Martinoni |
| 9,580,551 | B2 | 2/2017 | Vanelli et al. |
| 11,780,956 | B2 | 10/2023 | Desai et al. |
| 2007/0129531 | A1 | 6/2007 | Germroth et al. |
| 2010/0160547 | A1 | 6/2010 | Martinoni |
| 2012/0329980 | A1 | 12/2012 | George et al. |
| 2017/0066873 | A1 | 3/2017 | Gardet |
| 2018/0230274 | A1 | 8/2018 | Liu et al. |
| 2021/0009754 | A1 | 1/2021 | Desai et al. |
| 2021/0069860 | A1 | 3/2021 | Chaudhari et al. |
| 2021/0107216 | A1 | 4/2021 | Chaffins et al. |
| 2021/0138725 | A1 | 5/2021 | Erickson et al. |
| 2021/0170691 | A1 | 6/2021 | Lebron et al. |
| 2021/0206114 | A1 | 7/2021 | Schramm et al. |
| 2021/0283834 | A1 | 9/2021 | Van Brocklin et al. |
| 2021/0331383 | A1 | 10/2021 | Flack et al. |
| 2022/0169785 | A1 | 6/2022 | Goetz et al. |

FOREIGN PATENT DOCUMENTS

| | | | |
|---|---|---|---|
| KR | 20060072547 | A | 6/2006 |
| WO | WO 2016/112283 | A1 | 7/2016 |
| WO | WO 2017/220228 | A1 | 12/2017 |

OTHER PUBLICATIONS

Notification of Transmittal of the International Search Report and the Written Opinion of the International Searching Authority with Date of Mailing Oct. 5, 2020 for International Application No. PCT/US2020/041100.

Notification of Transmittal of the International Search Report and the Written Opinion of the International Searching Authority with Date of Mailing May 23, 2019 for International Application No. PCT/US2019/021072.

ASTM E1356; "Standard Test Method for Assignment of the Glass Transition Temperatures by Differential Scanning Calorimetry"; Published Apr. 2014.

ASTM D3418; "Standard Test Method for Transition Temperatures and Enthalpies of Fusion and Crystallization of Polymers by Differential Scanning Calorimetry"; Published Sep. 2021.

ASTMF2625-10; "Standard Test Method for Measurement of Enthalpy of Fusion, Percent Crystallinity, and Melting Point of Ultra-High-Molecular Weight Polyethylene by Means of Differential Scanning Calorimetry"; Published Apr. 1, 2016.

ASTMD638; "Standard Test Method for Tensile Properties of Plastics" Published Mar. 2015.

Jones, L. D., et al. "Heat of Fusion of Lexan Polycarbonate"; Polymer Letters vol. 4, (1966), pp. 803-808.

Mercier, J. P., et al., "Correlation between the enthalpy of fusion and the specific volume of crystallized poly-carbonate of bisphenol A."; Polymer Letters vol. 8, (1970), pp. 645-650.

Co-pending U.S. Appl. No. 16/979,922, filed Sep. 11, 2020.

Co-pending U.S. Appl. No. 16/979,922, filed Sep. 11, 2020; Desai et al.; Publication No. 2021-0009754.

USPTO Office Action dated Jul. 7, 2022 received in co-pending U.S. Appl. No. 16/979,922.

(Continued)

*Primary Examiner* — Rabon A Sergent
(74) *Attorney, Agent, or Firm* — Robert C. Morriss

(57) ABSTRACT

A build material for additive manufacturing applications is disclosed. The build material includes a build composition in powder form, The build composition includes a semi-crystalline polymer having a glass transition temperature of at least 70° C. and an onset melting temperature of at least 125° C., as measured by DSC, and that exhibits an amorphous return. A semi-crystalline polymer useful in additive manufacturing applications and a method for making the semi-crystalline polymer article are also described.

20 Claims, 4 Drawing Sheets

(56) References Cited

OTHER PUBLICATIONS

USPTO Office Action dated Feb. 9, 2023 received in co-pending U.S. Appl. No. 16/979,922.
USPTO Notice of Allowance dated May 30, 2023 received in co-pending U.S. Appl. No. 16/979,922.
Schick, C.; Differential scanning calorimetry (DSC) of semicrystalline polymers; Anal Bioanal Chem; (2009) 395:1589-1611.

BUILD MATERIALS FOR ADDITIVE MANUFACTURING APPLICATIONS

CROSS-REFERENCE TO RELATED APPLICATION(S)

This application is a national stage filing under 35 USC § 371 of International Application Number PCT/US2020/041100, filed on, Jul. 8, 2020 which claims the benefit of the filing date to U.S. Provisional Application No. 62/871,425, filed on Jul. 8, 2019, the entire disclosures of which are incorporated by reference herein.

FIELD OF THE INVENTION

The present invention generally pertains to a build material and a semi-crystalline polymer useful for additive manufacturing applications.

BACKGROUND OF THE INVENTION

3-D printing, also known in the art as additive manufacturing, refers to a class of processes for the production of three-dimensional objects wherein multiple layers of a material known as a "build material" are applied to a bed or substrate on a layer-by-layer basis. Such processes are particularly useful in the manufacture of prototypes, models and molds; however, more recently these processes have been increasingly utilized for production parts, consumer products, medical devices and the like.

One recognized and widely practiced additive manufacturing process is known in the art as laser sintering. In general, laser sintering involves applying a layer of powdered or pulverulent polymer material to a target or build surface; heating a portion of the material; irradiating selected or desired part locations/shape with laser energy to sinter those portions and produce a part "slice"; and repeating these steps multiple times (the repetition often referred to as the "build") to create useful parts in the form of sequentially formed, multiple fused layers. Laser sintering is described for example in U.S. Pat. Nos. 6,100,411; 5,990,268 and 8,114,334, the descriptions and disclosure of which are hereby incorporated herein by reference. Additive manufacturing processes that utilize other irradiation energy sources such as infrared radiation are also known in the art. Fusion could be complete or partial fusion.

Commercial materials currently used for laser sintering generally require an intimate interrelationship and tenuous balance between various temperatures used in laser sintering processes. The temperature-related and/or temperature-dependent characteristics and parameters of the polymer powder such as glass transition temperature, melt temperature, crystallinity and rate of crystallization (and of recrystallization after melting) typically require tight control to effectively utilize the polymer powder for laser sintering. In describing a laser sintering method and system, U.S. Pat. No. 9,580,551, the description and disclosure of which is incorporated herein by reference, notes that if the system maintains the bed of powder at a temperature that is too low (e.g., too near such powder's recrystallization point), then the fused powder may return to a solid state (or "recrystallize") too quickly, which may cause the formed object to warp or deform. This patent further notes that, if the system maintains the bed of powder at a temperature that is too high (e.g., too near such powder's melting point), then the remaining unfused powder may partially melt, which may increase the relative difficulty of separating the remaining unfused powder from the formed object. This difficulty of separating in turn reduces the recyclability of the material or the ability to reuse the material.

Avoidance of curl by maintaining temperature at "maximum uniformity" just below the melting point of the polymeric material is also described in U.S. Pat. No. 7,906,063. The above-referenced '268 patent defines a "window of sinterability" temperature range and notes that a major practical consequence of the narrowly defined window requires that the part bed be maintained at a specified temperature and with a specified temperature profile so that each layer to be sintered lies within the confines of the selective-laser-sintering-window. As described, a different temperature, whether higher or lower, and/or a different temperature profile, results in regions of the just-sintered initial slice of powder which will either cause an already sintered slice to melt and be distorted in a layer of the part bed which has "caked"; or, will cause an already sintered slice to curl if the part bed temperature is too low.

Many laser sintering printers were designed for Nylon 12 which can be formed into a powder that has a very narrow and well-defined melting temperature. To find utility in such powder laser sintering printers a polymer must be designed to have thermal properties similar to Nylon 12. However, even Nylon 12 has some drawbacks in that the printed layer must be kept at a relatively high temperature and then cooled slowly or the polymer will recrystallize too quickly and distort the part.

Product offerings to date have not relieved manufacturers from the burdens of meticulous process temperature control and the corresponding equipment and manufacturing costs, and the product quality issues such as warping and curling that can accompany failure to maintain such control. It would be beneficial to have new product offerings that provide improvements in these areas.

SUMMARY OF THE INVENTION

Most commercial copolyesters are practically amorphous, where pellets do not display semi-crystalline behavior after manufacturing or after thermal processing. Practically amorphous copolyesters do not function in laser sintering as glass transition temperatures (Tg's) between 70° C. and 120° C., measured by scanning at 20° C./min using DSC (as described herein), require powder bed temperatures to remain below the Tg and the temperatures required to consolidate the powder after laser exposure would require impractical, long laser irradiation and long print times. Most copolyesters can crystallize but the time to crystallize under reasonable conditions is inhibiting. There are three methods that can practically be used to crystallize copolyesters: thermal annealing, external plasticizers, or solvent crystallization. Thermal annealing is challenging as the temperature required to most rapidly anneal is significantly above Tg, commonly at least 140° C. Increasing the temperature above Tg causes pellets to stick together. External plasticizers can cause crystallization but cause deposits and condensate issues in printers. Solvent crystallization has been attempted but clumping, or caking, occurs during printing. It has now been found that polymers that could not previously be used successfully for laser sinter printing can be processed to yield powder that prints in a variety of printers.

In a first aspect, a build material for additive manufacturing applications is provided. The build material includes a build composition in powder form. In embodiments, the build composition includes a semi-crystalline polymer having a glass transition temperature of at least 70° C., an onset melting temperature of at least 125° C., a Tm of at least 170° C., and a dHf of at least 21 J/g, all measured using DSC. In embodiments, the semi-crystalline polymer is a crystallized amorphous polymer that exhibits an amorphous return. In embodiments, the semi-crystalline polymer has a glass transition temperature from 70° C. to 200° C., an onset melting temperature from 125° C. to 10° C. below the Tm, a Tm from 170° C. to 275° C., and a dHf from 21 J/g to 40 J/g.

In a second aspect, a semi-crystalline polymer useful in additive manufacturing applications is provided. In embodiments, the polymer has having a glass transition temperature of at least 70° C., an onset melting temperature of at least 125° C., a Tm of at least 170° C., and a dHf of at least 21 J/g, all measured using DSC. In embodiments, the semi-crystalline polymer is a crystallized amorphous polymer that exhibits an amorphous return. The polymer may be in the form of a powder and/or may be a component of a polymer composition that is in the form of a powder.

In a third aspect, a method for making an additive manufacturing polymer is provided. In embodiments, the method includes the steps of:

(a) providing a bulk of amorphous polymer pellets;

(b) solvent annealing the bulk of amorphous polymer pellets under conditions to provide a partially solvent annealed bulk of polymer pellets, wherein said pellets have an amorphous center and a semi-crystalline shell sufficient to prevent the pellets from sticking in a thermal annealing process; and (c) thermally annealing said partially solvent annealed bulk of polymer pellets under conditions to provide a thermally annealed bulk of polymer pellets, wherein the pellets have a semi-crystalline center and a semi-crystalline shell; and wherein the thermally annealed polymer has a dHf of at least 21 J/g, measured using DSC, and exhibits an amorphous return.

In embodiments, the amorphous polymer pellets have a Tg of at least 70° C. In embodiments, the amorphous polymer is a copolyester. In embodiments, the crystalline shell has a thickness of 15% or less, or 10% or less, of the pellet diameter.

Further aspects of the invention are as disclosed and claimed herein.

DETAILED DESCRIPTION

In one aspect, a polymer is provided that is useful for selective laser sintering additive manufacturing (SLS-AM). The characteristics needed for such a polymer are based on an understanding of the process and the thermal profile of the powder as it is transformed from powder to part. In embodiments, the polymer useful for SLS-AM can be printed using processes/equipment primarily designed/configured for polyamide 12 (PA12) (or Nylon 12). In embodiments, such a process can be as follows: a room temperature build material powder is added to a printer bed where temperature can be controlled from room temperature up to and beyond 170° C., which are common PA12 bed temperatures. A thin layer of heated powder is rolled out to the print bed where the design of that layer is sintered using a high energy laser. The laser raises the temperature of the powder above the melting point, commonly greater than 200° C. The part bed (being formed layer by layer) is lowered and the next layer is spread onto the part bed and the process is repeated until the print is completed. Final sintered parts are then removed from the powder bed.

Figure 1:
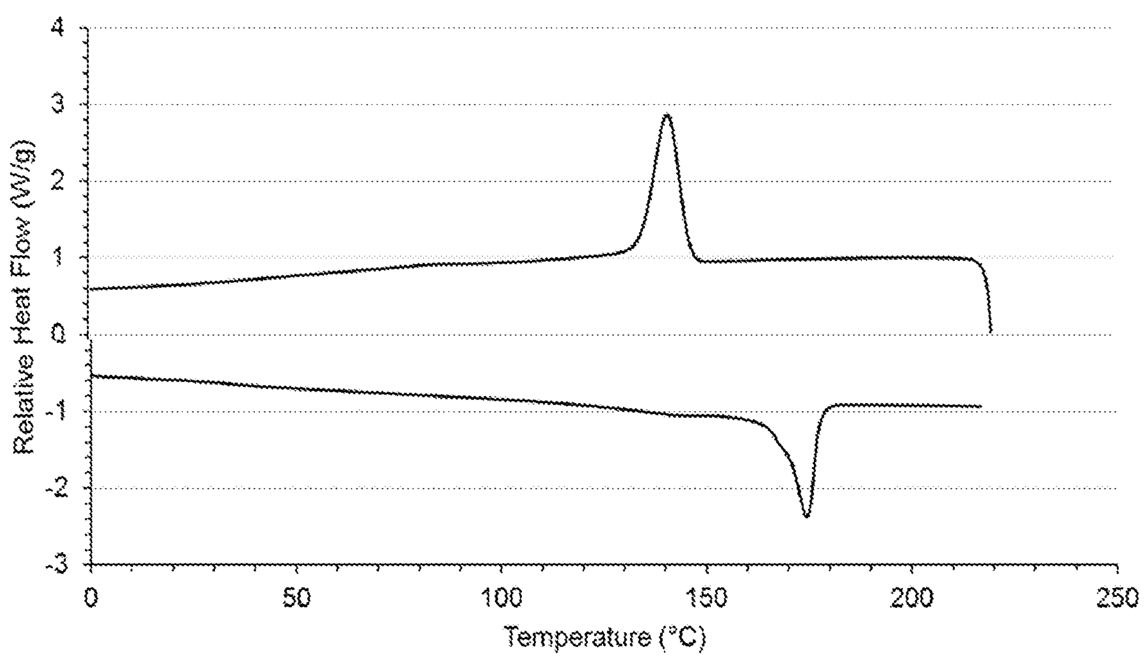
FIG. 1 is a graph showing DSC heating and cooling scans of Nylon 12.

In embodiments, the thermal profile of the polymer matches that of polyamide 12 (PA12), such that it can be dropped into an SLS printer designed for PA12. DSC heating and cooling thermograms for Nylon 12 are shown in FIG. 1 where a 175° C. melting peak and a 140° C. crystallization peak are shown. In embodiments, a copolyester is provided that matches this melting temperature sufficiently to allow a copolyester powder to be printed using an SLS printer designed for PA12.

In one aspect, a build material is provided that includes a build composition in powder form. A suitable particle size range for the powder form of the build material is between 20 and 200 um as measured by DLS and a suitable median for the volume particle size distribution (referred to as $D_v[50]$) is from 40 to 80 μm as measured by dynamic light scattering (DLS). The build composition is present in the build material in the amount of from 40% to 100% by volume of the build material based on the total volume of the solids fraction of the build material. Additional but optional ingredients in the build material include one or more of crystallizing agents such as nucleating agents; colorants; heat and/or light stabilizers; heat absorbing agents such as heat absorbing inks; anti-oxidants, flow aids, and filler materials such as glass, mineral, carbon fibers and like. In an embodiment where the build composition is present in the build material in the amount of 100% by volume of the build material, the build material is the build composition in polymer form. Accordingly, in an embodiment, the build material may consist essentially of or consist of the build composition in powder form.

In embodiments, the build composition includes a semi-crystalline polymer which is a component of the build composition. "Semi-crystalline" is defined as a polymer with crystallinity level determined by a heat of fusion or dHf of 2 J/g or more, as measured by DSC. "Amorphous" is defined as a polymer with a dHf of less than 2 J/g, as measured by DSC. Beyond melting point the glass transition temperature can be important in considering copolyesters for additive manufacturing, e.g., SLS-AM. Higher glass transition temperatures yield a higher zero shear melt viscosity and glass transition temperature also plays a role in crystallization kinetics. In embodiments, crystallization kinetics can be characterized using the Fastest Crystallization Half-time (FCH), where polyesters with a fast crystallization half time are, for practical purposes, semi-crystalline. In contrast, significantly long FCH results in a practically amorphous polymer that does not crystallize under traditional melt processing methods such as injection molding, extrusion, or blow molding.

In embodiments, the semi-crystalline polymers can have a glass transition temperature ($T_g$) of at least 70° C. and FCH less than 200 minutes, or less than 150 minutes. In embodiments, the semi-crystalline polymers are chosen from polyesters, copolyesters, polycarbonates, polyamides and polyether ketones, provided such polymers exhibit amorphous return. Particularly suitable semi-crystalline polymers have a crystallinity of determined by a dHf from 21 to 40 J/g. In embodiments, the semi-crystalline polymer has a FCH of from 10 to 150 minutes, or 15 to 150 minutes, or 20 to 150 minutes. In embodiments, the semi-crystalline polymer is present in the build composition in an amount of from 60% to 100% by volume of the build composition based on the total volume of the solids fraction of the build composition. In an embodiment wherein the build composition includes 100% semi-crystalline polymer by volume based on the total volume of the solids fraction of the build composition, the semi-crystalline polymer is in the form of a powder and the build composition is a semi-crystalline polymer (as described herein) in powder form. Accordingly, in an embodiment, the build composition may consist essentially of or consist of the semi-crystalline polymer in powder form.

The semi-crystalline polymer in one embodiment is a crystallized amorphous polymer. "Crystallized amorphous polymer" is defined herein as a semi-crystalline polymer formed through inducement of crystalline structure starting from an amorphous polymer through solvent annealing and/or thermal annealing crystallization. Crystallized amorphous polymers have a crystallinity level higher than that of the polymer before the crystallinity inducement process. Other methods for inducing crystalline structure in generally amorphous polymers are known in the art, including for example solvent precipitation crystallization, thermal crystallization and strain crystallization and the like.

Solvent annealing crystallization involves exposing a polymer to a low molecular weight (below about 500 g/mol) solvent vapor or solvent liquid to swell the polymer without substantially dissolving it or causing the polymer pellets to stick together. Selection of a suitable solvent for solvent annealing crystallization will depend in part on the polymer type to be crystallized. For example, acetone or methyl acetate are suitable choices of solvent for copolyesters and may be used either in pure form or as part of an aqueous system. A partially miscible solvent system can also be used to expand the range of solvent choices. The polymer can be maintained at the solvent crystallization temperature or a series of increasing crystallization temperatures below the melting temperature until the desired level of crystallinity has been achieved. In embodiments, the solvent crystallization can be performed at room temperature. Any residual solvent can be removed via thermal and/or vacuum treatments. The polymer may also be heated to a temperature at which crystallization is faster than at the solvent exposure temperature. Nucleation agents may also be incorporated via compounding or some other process to promote or control crystallization of the amorphous polymer.

In an aspect, a process for making a semi-crystalline polymer is provided where solvent annealing and thermal annealing are combined to yield semi-crystalline pellets that do not stick together at temperatures between Tg and Tm. As used herein, Tm refers to highest temperature of an endothermic peak apex on the DSC first heating curve (measured at a heating rate of 20° C./min). For clarity, in the event of multiple (e.g., overlapping) endothermic peaks (on the DSC curve), Tm is the peak of the highest temperature, after deconvolution of the multiple peaks. Solvent crystallization causes crystallization progressing through the outer surface of crystallizable copolyesters. In embodiments, pellets having a crystallized surface shell will appear hazy while the interior of the pellet will remain amorphous.

In embodiments, solvent crystallization can be performed on copolyesters with FCH less than 200 minutes. It has been discovered that copolyesters with FCH too high will swell in solvent and stick together during solvent exposure. It was also discovered that thermal annealing amorphous copolyester pellets without first solvent annealing the surface results in the pellets sticking together. In embodiments, the polyesters have an FCH of less than 200 minutes, or less than 150 minutes. In embodiments, the polyesters have an FCH of more than 10 minutes, or more than 15 minutes, or more than 20 minutes. In embodiments, the polyesters have an FCH from 10 to 200 minutes, or 10 to 150 minutes, or 10 to 100 minutes, or 10 to less than 100 minutes, or 15 to 200 minutes, or 15 to 150 minutes, or 15 to 100 minutes, or 15 to less than 100 minutes, or 20 to 200 minutes, or 20 to 150 minutes, or 20 to 100 minutes, or 20 to less than 100 minutes.

In embodiments, amorphous polymer pellets without solvent annealing results in the pellets sticking together during thermal annealing. In embodiments, solvent annealing the pellets alone (i.e., solvent annealing too much or without subsequent thermal annealing) will not yield pellets with enough crystal uniformity or enough crystalline content. In embodiments, thermal annealing the pellets alone (i.e., without surface solvent annealing) will result in pellets sticking together and thermal annealing of pellets that are kept separated from one another (during the annealing process) will not be practical.

Figure 2:
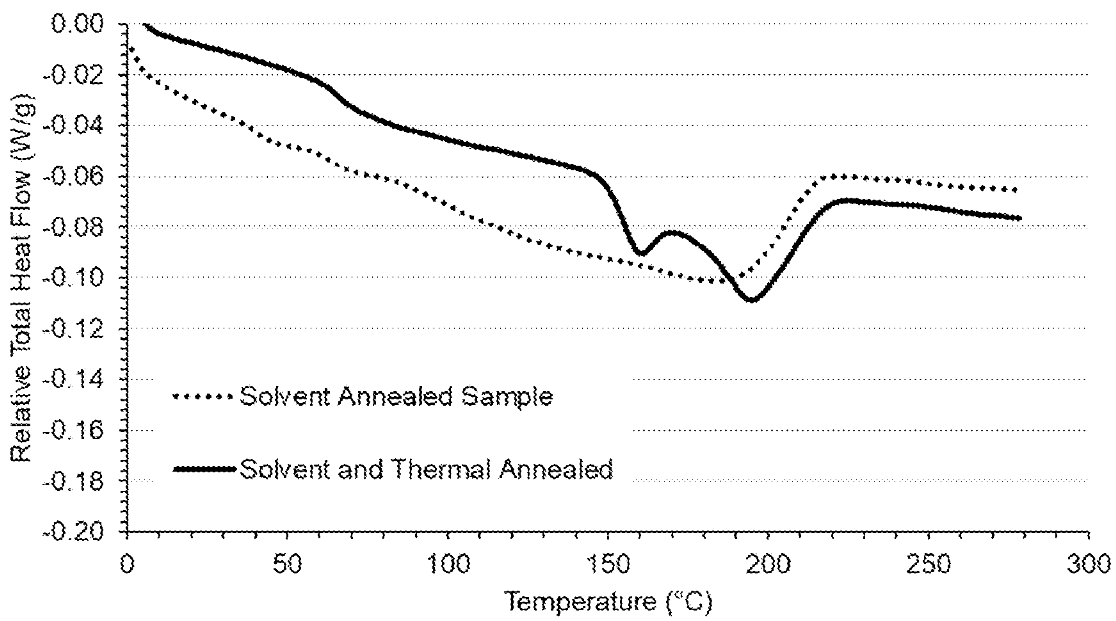
FIG. 2 is a graph showing DSC thermograms for solvent annealed vs. solvent and thermal annealed pellets.

Pellets that are solvent annealed for 24 hours showed poor thermal behavior where a distinct melting peak was not apparent. FIG. 2 shows the differences in melting peak shape after exposure to solvent and after thermal exposure for Polymer 1.

A review of FIG. 2 reveals that the solvent annealed pellets show a very broad melting peak that is undesirable for laser sintering because the powder will start to melt and stick together at typical bed temperature. Also, the amorphous core of the pellets (for pellets that were previously partially surface solvent annealed) was found to be thermally crystallizable. Drying/holding the solvent crystallized pellet at $T_{CH}$ resulted in opaque crystallized pellets.

As noted above, in embodiments, the semi-crystalline polymer component of the build composition of the present invention may be characterized by (i) a glass transition temperature ($T_g$) of at least 70° C., (ii) an onset melting temperature of at least 125° C., (iii) a Tm of at least 170° C., and (iv) a dHf of at least 21 J/g, all measured using DSC. In embodiments, the semi-crystalline polymer is a crystallized amorphous polymer that exhibits an amorphous return. The polymer may be in the form of a powder and/or may be a component of a polymer composition that is in the form of a powder. In embodiments, pellets manufactured using solvent and thermal annealing processes (as described herein) can be cryoground to powder less than 100 microns, and then parts can be printed from the powder.

Glass transition temperature, as well known in the art, is the temperature at which the mechanical properties of a polymer fairly rapidly change glassy to rubbery due to the internal movement of the polymer chains that form the polymer. This change in behavior is typically measured by Differential Scanning calorimetry (DSC) techniques known in the art and is evidenced for example by a sharp decline in modulus (stiffness) or increase in impact strength as the ambient temperature is increased. Glass transition temperature is measured according to the methods known in the art, such as ASTM E1356-08(2014). In embodiments, suitable semi-crystalline polymers for the build composition of the present invention have a glass transition temperature of from 70° C. to 120° C., or 75° C. to 90° C., or 90° C. to 120° C.

Fastest crystallization half-time (FCH), as the phrase is utilized herein, refers to the minimum length of time required to achieve approximately half of the maximum crystallinity achievable at a given crystallization temperature. FCH depends in part on the crystallization temperature Tc, and FCH is typically at its minimum, i.e., maximum crystallization rate, at a temperature approximately half way between the glass transition temperature ($T_g$) and the melt temperature ($T_m$). FCH is determined for the present invention using the small angle light scattering (SALS) technique described below wherein a helium-neon laser is used to measure the time at which the intensity of scattered light increases to half of the maximum scattered intensity achieved. A sample is first melted at a temperature well above the melt temperature to remove all preexisting crystallinity. Then, the sample is rapidly cooled to a predetermined temperature ($T_{cool}$) and the scattered light intensity is recorded as a function of time. The time at which the scattered light intensity increases to half the maximum value denotes the crystallization half-time reported. As crystallization rate varies with temperature, the temperature at which the crystallization rate is the highest in this range (corresponding to the temperature with the fastest crystallization half-time in the temperature range) was chosen to quantify the parameter for comparison purposes hereunder.

Crystallinity level is an indicator of the level of crystalline domains in a polymer. Crystallinity level can be measured by using DSC and the enthalpy of fusion of the polymer. Crystallinity is measured according to methods known in the art, for example as described in ASTM D3418-15. The degree of crystallization can be determined using a differential scanning calorimeter and plotting heat flow versus temperature and heating the sample in N2 purge at 20° C./min from RT to 290° C. Crystalline content is defined here as the heat of fusion determined according to ASTM D3418-15 section 11 from the plot of heat flow versus temperature using the area of the melting endotherm, in J/g, where the baseline is interpolated from the steady state heat flow (i.e., the area of the curve under the dashed line). An example of the dHf area determination for PA12 is shown in FIG. 3.

Figure 3:
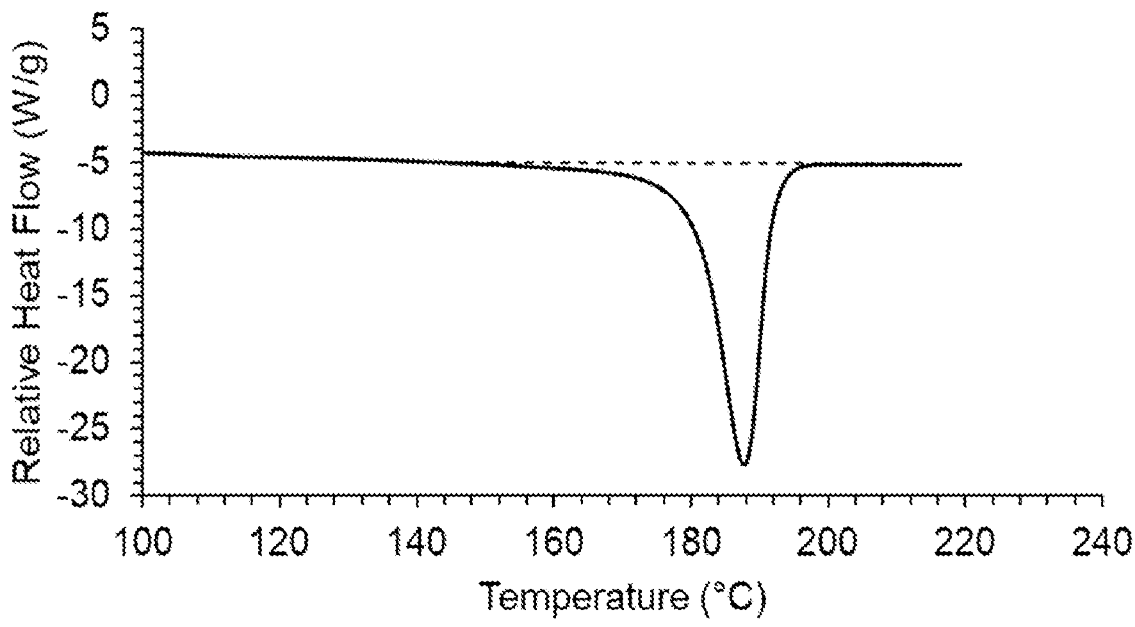
FIG. 3 is a plot showing an example for calculating dHf.

A review of FIG. 3 shows the departure of the melting peak near 150° C. and the baseline is shown as an interpolation of the baseline from 150 to 200° C. Calculation of the area under the peak is achieved through integration. Here the dHf of nylon 12 is determined to be 32 J/g.

In embodiments, semi-crystalline polymers can be chosen from polyesters, copolyesters, polycarbonates, polyamides, polyether ketones and copolymers thereof, provided such polymer(s) exhibit amorphous return. In embodiments, the semi-crystalline polymers can be chosen from polyesters or copolyesters. Particularly suitable semi-crystalline polymers are polyesters, which includes copolyesters. In general, such polyesters are formed from one or more acids and one or more glycols (also referred to in the art as diols). The acid component can in some cases include a diacid component and can include for example units derived from a terephthalic acid (TPA), units derived from an isophthalic acid (IPA), units derived from a cyclohexanedicarboxylic acid, units derived from a naphthalene dicarboxylic acid, units derived from a stilbenedicarboxylic acid, units derived from furandicarboxylic acid, or combinations thereof. The acid component can include units of a first acid and units of one or more second acids. To illustrate, the first acid can include terephthalic acid and, in addition, one or more second acids can be selected from a group of diacids including isophthalic acid, 1,3-cyclohexanedicarboxylic acid, 1,4cyclohexanedicarboxylic acid, a naphthalenedicarboxylic acid, a stilbenedicarboxylic acid, furandicarboxylic acid, sebacic acid, dimethylmalonic acid, succinic acid, or combinations thereof. In some particular examples, the naphthalenedicarboxylic acid can include 1,4-naphthalenedicarboxylic acid, 1,5-naphthalenedicarboxylic acid, 2,6-naphthalenedicarboxylic acid, or 2,7-naphthalenedicarboxylic acid. In some particular examples, the furandicarboxylic acid can include 2,5-furandicarboxylic acid.

The glycol component can include units derived from cyclohexanedimethanol (CHDM), ethylene glycol (EG), 2,2,4,4-tetramethyl-1,3-cyclobutanediol (TMCD), propane diol, isosorbide, spiro-glycol (SPG), or combinations thereof. It should be understood that other glycol units may form in-situ during polymer synthesis and become part of the resulting polymer, generally up to a 4 mole % or less. For example, polyesters made from EG generally form units of diethylene glycol (DEG) during polymer synthesis. Thus, even if not specified, it should be understood that polyesters made with EG (as described herein) may contain up to 5 mole %, or up to 4 mole %, or less DEG units (or residues). The glycol component can include units derived from a first glycol and units derived from one or more second glycols. To illustrate, the first glycol can include cyclohexanedimethanol and the one or more second glycols can include one or more glycols including about 2 to about 20 carbon atoms. In a particular example, the one or more second glycols can include ethylene glycol, 2,2,4,4-tetramethyl-1,3-cyclobutanediol, 1,2-propanediol, 1,3-propanediol, neopentyl glycol, 1,4-butanediol, 1,5-pentanediol, 1,6-hexanediol, p-xylene glycol, spiro-glycol, isosorbide, or combinations thereof.

Polyesters, as well as suitable acids and glycols for forming them, are generally described for example in U.S. Published Patent Application Nos. 2012/0329980 and 2017/0066873, both assigned to the assignee of the present invention, the contents and disclosure of which are hereby incorporated herein by reference.

In one embodiment, the build material for additive manufacturing applications includes a build composition in powder form and the build composition includes a semi-crystalline copolyester having a glass transition temperature of at least 70° C., with the semi-crystalline copolyester including 55 to 100 mole % terephthalic acid residues and 30 to 100 mole % CHDM residues, wherein the total acid residue content and total glycol residue content are each 100 mole %.

In embodiments, the polyester comprises:

(a) a dicarboxylic acid component comprising from about 55 to about 90 mole percent of TPA residues and from about 10 to about 45 mole percent IPA residues; and (b) a glycol component comprising 85 to 100 mole percent of CHDM residues, wherein the polyester comprises a total of 100 mole percent diacid residues and a total of 100 mole percent diol residues. In embodiments, the dicarboxylic acid component comprises 20 to 45 mole percent, 20 to 42 mole percent, or 20 to 40 mole percent, or 20 to 35 mole percent, or 20 to 30 mole percent, or 30 to 45 mole percent, or 30 to 42 mole percent, or 30 to 40 mole percent of IPA residues. In embodiments, the balance of the dicarboxylic acid component is TPA resides. In embodiments, the glycol component comprises 90 to 100 mole percent, or 95 to 100 mole percent, or 96 to 100 mole percent, or 100 mole percent of CHDM residues. In embodiments, the inherent viscosity of the polyester is from 0.1 to 1.2 dL/g as determined in 60/40 (wt/wt) phenol/tetrachloroethane at a concentration of 0.5 g/100 ml at 25° C.; and the polyester has a Tg of from 70 to 100° C.

In embodiments, the polyester comprises:

(a) a dicarboxylic acid component comprising:
- i) 70 to 100 mole % of terephthalic acid residues;
- ii) 0 to 30 mole % of aromatic dicarboxylic acid residues having up to 20 carbon atoms; and
- iii) 0 to 10 mole % of aliphatic dicarboxylic acid residues having up to 16 carbon atoms; and (b) a glycol component comprising:
- i) 10 to 70 mole % of 1,4-cyclohexanedimethanol (CHDM) residues; and
- ii) 30 to 90 mole % of ethylene glycol (EG) residues, wherein the total mole % of the dicarboxylic acid component is 100 mole %, the total mole % of the glycol component is 100 mole %; and wherein the inherent viscosity of the polyester is from 0.1 to 1.2 dL/g as determined in 60/40 (wt/wt) phenol/tetrachloroethane at a concentration of 0.5 g/100 ml at 25° C.; and wherein the polyester has a Tg of from 70 to 100° C. In embodiments, the glycol component comprises CHDM residues in an amount from 15 to 60 mole %, or 15 to 56 mole %, or 15 to 55 mole %, or 15 to 50 mole %, or 15 to 45 mole %, or 15 to 40 mole %, or 15 to 35 mole %, or 15 to 30 mole %, or 15 to 25 mole %, or 19 to 60 mole %, or 19 to 56 mole %, or 19 to 55 mole %, or 19 to 50 mole %, or 19 to 45 mole %, or 19 to 40 mole %, or 19 to 35 mole %, or 19 to 30 mole %, or 19 to 25 mole %. In embodiments, the glycol component comprises CHDM residues in an amount from 30 to 60 mole %, or 30 to 56 mole %, or 30 to 55 mole %, or 30 to 50 mole %, or 30 to 45 mole %, or 30 to 40 mole %, or 40 to 60 mole %, or 40 to 56 mole %, or 40 to 55 mole %, or 40 to 50 mole %, or 44 to 60 mole %, or 44 to 56 mole %, or 44 to 55 mole %, or 44 to 50 mole %. In embodiments having various ranges of CHDM residues (specified herein), the balance of the glycol component can be essentially EG residues. It should be understood that the glycol component may also include DEG residues, e.g., in amounts formed in-situ. In embodiments, the glycol component comprises DEG residues in an amount from 0.1 to 5 mole %, or 0.1 to 4 mole %, or 0.1 to 3 mole %.

In embodiments, the polyester comprises:

(a) a dicarboxylic acid component comprising:
- i) 70 to 100 mole % of terephthalic acid residues;
- ii) 0 to 30 mole % of aromatic dicarboxylic acid residues having up to 20 carbon atoms; and
- iii) 0 to 10 mole % of aliphatic dicarboxylic acid residues having up to 16 carbon atoms; and (b) a glycol component comprising:
- i) 15 to 60 mole % of 2,2,4,4-tetramethyl-1,3-cyclobutanediol (TMCD) residues; and
- ii) 40 to 85 mole % of 1,4-cyclohexanedimethanol (CHDM) residues, wherein the total mole % of the dicarboxylic acid component is 100 mole %, the total mole % of the glycol component is 100 mole %; and wherein the inherent viscosity of the polyester is from 0.1 to 1.2 dL/g as determined in 60/40 (wt/wt) phenol/tetrachloroethane at a concentration of 0.5 g/100 ml at 25° C.; and wherein the polyester has a Tg of from 80 to 120° C.

In embodiments, the glycol component comprises TMCD residues in an amount from 15 to 60 mole %, or 15 to 56 mole %, or 15 to 55 mole %, or 15 to 50 mole %, or 15 to 45 mole %, or 15 to 40 mole %, or 15 to 35 mole %, or 15 to 30 mole %, or 15 to 28 mole %, or 15 to 25 mole %, or 20 to 60 mole %, or 20 to 56 mole %, or 20 to 55 mole %, or 20 to 50 mole %, or 20 to 45 mole %, or 20 to 40 mole %, or 20 to 35 mole %, or 20 to 30 mole %, or 20 to 28 mole %, or 20 to 25 mole %. In embodiments having various ranges of TMCD residues (specified herein), the balance of the glycol component can be CHDM residues.

In embodiments, any one of the polyesters or polyester compositions described herein can further comprise residues of at least one branching agent. In embodiments, any one of the polyesters or polyester compositions described herein can comprise at least one thermal stabilizer or reaction products thereof.

In embodiments, the polyester composition contains at least one polycarbonate. In other embodiments, the polyester composition contains no polycarbonate.

In certain embodiments, unless included in specific embodiments in higher amounts, the polyesters useful in the invention contain less than 15 mole % ethylene glycol residues, such as, for example, 0.01 to less than 15 mole % ethylene glycol residues. In embodiments, the polyesters useful in the invention contain less than 10 mole %, or less than 5 mole %, or less than 4 mole %, or less than 2 mole %, or less than 1 mole % ethylene glycol residues, such as, for example, 0.01 to less than 10 mole %, or 0.01 to less than 5 mole %, or 0.01 to less than 4 mole %, or 0.01 to less than 2 mole %, or 0.01 to less than 1 mole %, ethylene glycol residues. In one embodiment, the polyesters useful in the invention contain no ethylene glycol residues.

In embodiments, the polyesters useful in the invention are made from no 1,3-propanediol, or, 1,4-butanediol, either singly or in combination. In other aspects, 1,3-propanediol or 1,4-butanediol, either singly or in combination, may be used in the making of the polyesters useful in this invention.

In embodiments containing TMCD residues, the mole % of cis-2,2,4,4-tetramethyl-1,3-cyclobutanediol useful in certain polyesters useful in the invention is greater than 50 mole % or greater than 55 mole % of cis-2,2,4,4-tetramethyl-1,3-cyclobutanediol or greater than 70 mole % of cis-2,2,4,4-tetramethyl-1,3-cyclobutanediol; wherein the total mole percentage of cis-2,2,4,4-tetramethyl-1,3-cyclobutanediol and trans-2,2,4,4-tetramethyl-1,3-cyclobutanediol is equal to a total of 100 mole %.

In embodiments containing TMCD residues, the mole % of the isomers of 2,2,4,4-tetramethyl-1,3-cyclobutanediol useful in certain polyesters useful in the invention is from 30 to 70 mole % of cis-2,2,4,4-tetramethyl-1,3-cyclobutanediol or from 30 to 70 mole % of trans-2,2,4,4-tetramethyl-1,3-cyclobutanediol, or from 40 to 60 mole % of cis-2,2,4,4-tetramethyl-1,3-cyclobutanediol or from 40 to 60 mole % of trans-2,2,4,4-tetramethyl-1,3-cyclobutanediol, wherein the total mole percentage of cis-2,2,4,4-tetramethyl-1,3-cyclobutanediol and trans-2,2,4,4-tetramethyl-1,3-cyclobutanediol is equal to a total of 100 mole %.

In embodiments, the semi-crystalline polymer has a glass transition temperature of at least 70° C., an onset melting temperature of at least 125° C., a Tm or at least 170° C., and a dHf of at least 21 J/g, all measured using DSC.

In embodiments, the Tg of the polymer can be at least one of the following ranges: 70 to 120° C.; 70 to 115° C.; 70 to 110° C.; 70 to 105° C.; 70 to 100° C.; 70 to 95° C.; 70 to 90° C.; 70 to 85° C.; 75 to 120° C.; 75 to 115° C.; 75 to 110° C.; 75 to 105° C.; 75 to 100° C.; 75 to 95° C.; 75 to 90° C.; 80 to 120° C.; 80 to 115° C.; 80 to 110° C.; 80 to 105° C.; 80 to 100° C.; 80 to 95° C.; 80 to 90° C.; 85 to 120° C.; 85 to 115° C.; 85 to 110° C.; 85 to 105° C.; 85 to 100° C.; 85 to 95° C.; 90 to 120° C.; 90 to 115° C.; 90 to 110° C.; 90 to 105° C.; 90 to 100° C.; 95 to 120° C.; 95 to 115° C.; 95 to 110° C.; 95 to 105° C.; 100 to 120° C.; 100 to 115° C.; 100 to 110° C.; 105 to 120° C.; 105 to 115° C.

In embodiments, the onset melting temperature of the semi-crystalline polymer can be at least one of the following ranges: 125 to 10° C. below the Tm; 125 to 220° C.; 125 to 215° C.; 125 to 210° C.; 125 to 205° C.; 125 to 200° C.; 125 to 195° C.; 125 to 190° C.; 125 to 185° C.; 125 to 180° C.; 125 to 175° C.; 125 to 170° C.; 125 to 165° C.; 125 to 160° C.; 125 to 155° C.; 125 to 150° C.; 125 to 145° C.; 125 to 140° C.; 125 to 135° C.; 130 to 220° C.; 130 to 215° C.; 130 to 210° C.; 130 to 205° C.; 130 to 200° C.; 130 to 195° C.; 130 to 190° C.; 130 to 185° C.; 130 to 180° C.; 130 to 175° C.; 130 to 170° C.; 130 to 165° C.; 130 to 160° C.; 130 to 155° C.; 130 to 150° C.; 130 to 145° C.; 130 to 140° C.; 135 to 220° C.; 135 to 215° C.; 135 to 210° C.; 135 to 205° C.; 135 to 200° C.; 135 to 195° C.; 135 to 190° C.; 135 to 185° C.; 135 to 180° C.; 135 to 175° C.; 135 to 170° C.; 135 to 165° C.; 135 to 160° C.; 135 to 155° C.; 135 to 150° C.; 135 to 145° C.; 140 to 220° C.; 140 to 215° C.; 140 to 210° C.; 140 to 205° C.; 140 to 200° C.; 140 to 195° C.; 140 to 190° C.; 140 to 185° C.; 140 to 180° C.; 140 to 175° C.; 140 to 170° C.; 140 to 165° C.; 140 to 160° C.; 140 to 155° C.; 140 to 150° C.; 145 to 220° C.; 145 to 215° C.; 145 to 210° C.; 145 to 205° C.; 145 to 200° C.; 145 to 195° C.; 145 to 190° C.; 145 to 185° C.; 145 to 180° C.; 145 to 175° C.; 145 to 170° C.; 145 to 165° C.; 145 to 160° C.; 145 to 155° C.; 150 to 220° C.; 150 to 215° C.; 150 to 210° C.; 150 to 205° C.; 150 to 200° C.; 150 to 195° C.; 150 to 190° C.; 150 to 185° C.; 150 to 180° C.; 150 to 175° C.; 150 to 170° C.; 150 to 165° C.; 150 to 160° C.; 155 to 220° C.; 155 to 215° C.; 155 to 210° C.; 155 to 205° C.; 155 to 200° C.; 155 to 195° C.; 155 to 190° C.; 155 to 185° C.; 155 to 180° C.; 155 to 175° C.; 155 to 170° C.; 155 to 165° C.; 160 to 220° C.; 160 to 215° C.; 160 to 210° C.; 160 to 205° C.; 160 to 200° C.; 160 to 195° C.; 160 to 190° C.; 160 to 185° C.; 160 to 180° C.; 160 to 175° C.; 160 to 170° C.; 165 to 220° C.; 165 to 215° C.; 165 to 210° C.; 165 to 205° C.; 165 to 200° C.; 165 to 195° C.; 165 to 190° C.; 165 to 185° C.; 165 to 180° C.; 165 to 175° C.; 170 to 220° C.; 170 to 215° C.; 170 to 210° C.; 170 to 205° C.; 170 to 200° C.; 170 to 195° C.; 170 to 190° C.; 170 to 185° C.; 170 to 180° C.; 175 to 220° C.; 175 to 215° C.; 175 to 210° C.; 175 to 205° C.; 175 to 200° C.; 175 to 195° C.; 175 to 190° C.; 175 to 185° C.; 180 to 220° C.; 180 to 215° C.; 180 to 210° C.; 180 to 205° C.; 180 to 200° C.; 180 to 195° C.; 180 to 190° C.; 185 to 220° C.; 185 to 215° C.; 185 to 210° C.; 185 to 205° C.; 185 to 200° C.; 185 to 195° C.; 190 to 220° C.; 190 to 215° C.; 190 to 210° C.; 190 to 205° C.; 190 to 200° C.

In embodiments, the Tm of the semi-crystalline polymer can be at least one of the following ranges: 170 to 225° C.; 170 to 220° C.; 170 to 215° C.; 170 to 210° C.; 170 to 205° C.; 170 to 200° C.; 170 to 195° C.; 170 to 190° C.; 170 to 185° C.; 170 to 180° C.; 175 to 225° C.; 175 to 220° C.; 175 to 215° C.; 175 to 210° C.; 175 to 205° C.; 175 to 200° C.; 175 to 195° C.; 175 to 190° C.; 175 to 185° C.; 180 to 225° C.; 180 to 220° C.; 180 to 215° C.; 180 to 210° C.; 180 to 205° C.; 180 to 200° C.; 180 to 195° C.; 180 to 190° C.; 185 to 225° C.; 185 to 220° C.; 185 to 215° C.; 185 to 210° C.; 185 to 205° C.; 185 to 200° C.; 185 to 195° C.; 190 to 225° C.; 190 to 220° C.; 190 to 215° C.; 190 to 210° C.; 190 to 205° C.; 190 to 200° C.; 195 to 225° C.; 195 to 220° C.; 195 to 215° C.; 195 to 210° C.; 195 to 205° C.; 200 to 225° C.; 200 to 220° C.; 200 to 215° C.; 200 to 210° C.

In embodiments, the Tm of the semi-crystalline polymer can be at least one of the following ranges: 225 to 275° C.; 225 to 270° C.; 225 to 265° C.; 225 to 260° C.; 225 to 255° C.; 225 to 250° C.; 225 to 245° C.; 225 to 240° C.; 225 to 235° C.; 230 to 275° C.; 230 to 270° C.; 230 to 265° C.; 230 to 260° C.; 230 to 255° C.; 230 to 250° C.; 230 to 245° C.; 230 to 240° C.; 235 to 275° C.; 235 to 270° C.; 235 to 265° C.; 235 to 260° C.; 235 to 255° C.; 235 to 250° C.; 235 to 245° C.; 240 to 275° C.; 240 to 270° C.; 240 to 265° C.; 240 to 260° C.; 240 to 255° C.; 240 to 250° C.; 245 to 275° C.; 245 to 270° C.; 245 to 265° C.; 245 to 260° C.; 245 to 255° C.; 250 to 275° C.; 250 to 270° C.; 250 to 265° C.; 250 to 260° C.; 255 to 275° C.; 255 to 270° C.; 255 to 265° C.

For certain embodiments, the polyesters useful in the invention may exhibit at least one of the following inherent viscosities as determined in 60/40 (wt/wt) phenol/tetrachloroethane at a concentration of 0.5 g/100 ml at 25° C.: 0.10 to 1.2 dL/g; 0.10 to 1.1 dL/g; 0.10 to 1 dL/g; 0.10 to less than 1 dL/g; 0.10 to 0.98 dL/g; 0.10 to 0.95 dL/g; 0.10 to 0.90 dL/g; 0.10 to 0.85 dL/g; 0.10 to 0.80 dL/g; 0.10 to 0.75 dL/g; 0.10 to less than 0.75 dL/g; 0.10 to 0.72 dL/g; 0.10 to 0.70 dL/g; 0.10 to less than 0.70 dL/g; 0.10 to 0.68 dL/g; 0.10 to less than 0.68 dL/g; 0.10 to 0.65 dL/g; 0.20 to 1.2 dL/g; 0.20 to 1.1 dL/g; 0.20 to 1 dL/g; 0.20 to less than 1 dL/g; 0.20 to 0.98 dL/g; 0.20 to 0.95 dL/g; 0.20 to 0.90 dL/g; 0.20 to 0.85 dL/g; 0.20 to 0.80 dL/g; 0.20 to 0.75 dL/g; 0.20 to less than 0.75 dL/g; 0.20 to 0.72 dL/g; 0.20 to 0.70 dL/g; 0.20 to less than 0.70 dL/g; 0.20 to 0.68 dL/g; 0.20 to less than 0.68 dL/g; 0.20 to 0.65 dL/g; 0.35 to 1.2 dL/g; 0.35 to 1.1 dL/g; 0.35 to 1 dL/g; 0.35 to less than 1 dL/g; 0.35 to 0.98 dL/g; 0.35 to 0.95 dL/g; 0.35 to 0.90 dL/g; 0.35 to 0.85 dL/g; 0.35 to 0.80 dL/g; 0.35 to 0.75 dL/g; 0.35 to less than 0.75 dL/g; 0.35 to 0.72 dL/g; 0.35 to 0.70 dL/g; 0.35 to less than 0.70 dL/g; 0.35 to 0.68 dL/g; 0.35 to less than 0.68 dL/g; 0.35 to 0.65 dL/g; 0.40 to 1.2 dL/g; 0.40 to 1.1 dL/g; 0.40 to 1 dL/g; 0.40 to less than 1 dL/g; 0.40 to 0.98 dL/g; 0.40 to 0.95 dL/g; 0.40 to 0.90 dL/g; 0.40 to 0.85 dL/g; 0.40 to 0.80 dL/g; 0.40 to 0.75 dL/g; 0.40 to less than 0.75 dL/g; 0.40 to 0.72 dL/g; 0.40 to 0.70 dL/g; 0.40 to less than 0.70 dL/g; 0.40 to 0.68 dL/g; 0.40 to less than 0.68 dL/g; 0.40 to 0.65 dL/g; greater than 0.42 to 1.2 dL/g; greater than 0.42 to 1.1 dL/g; greater than 0.42 to 1 dL/g; greater than 0.42 to less than 1 dL/g; greater than 0.42 to 0.98 dL/g; greater than 0.42 to 0.95 dL/g; greater than 0.42 to 0.90 dL/g; greater than 0.42 to 0.85 dL/g; greater than 0.42 to 0.80 dL/g; greater than 0.42 to 0.75 dL/g; greater than 0.42 to less than 0.75 dL/g; greater than 0.42 to 0.72 dL/g; greater than 0.42 to less than 0.70 dL/g; greater than 0.42 to 0.68 dL/g; greater than 0.42 to less than 0.68 dL/g; and greater than 0.42 to 0.65 dL/g; 0.45 to 1.2 dL/g; 0.45 to 1.1 dL/g; 0.45 to 1 dL/g; 0.45 to less than 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.77 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.77 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.50 to 1.2 dL/g; 0.50 to 1.1 dL/g; 0.50 to 1 dL/g; 0.50 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.77 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g.

In another aspect, a method for making an additive manufacturing polymer is provided. In embodiments, the method includes the steps of:

(a) providing a bulk of amorphous polymer pellets;

(b) solvent annealing the bulk of amorphous polymer pellets under conditions to provide a partially solvent annealed bulk of polymer pellets, wherein said pellets have an amorphous center and a semi-crystalline shell sufficient to prevent the pellets from sticking in a thermal annealing process; and (c) thermally annealing said partially solvent annealed bulk of polymer pellets under conditions to provide a thermally annealed bulk of polymer pellets, wherein the pellets have a semi-crystalline center and a semi-crystalline shell; and wherein the thermally annealed polymer has a dHf of at least 21 J/g, measured using DSC, and exhibits an amorphous return.

In embodiments, the solvent annealing is performed under conditions to provide a semi-crystalline shell having the minimum thickness to prevent pellets from sticking together in the thermal annealing step. In embodiments, the semi-crystalline shell has a thickness that is less than 10%, or less than 5%, or less than 4%, or less than 3%, or less than 2%, or less than 1%, or less than 0.5% of the diameter of the solvent annealed pellet. In embodiments, the solvent annealed pellets have a dHf of at least 3 J/g, or at least 4 J/g, or at least 5 J/g. In embodiments, the solvent annealed pellets have a dHf from 25 to 50% of the dHf of the thermally annealed pellets (in J/g).

In embodiments, the solvent annealing is carried out by contacting the pellets with solvent for 15 minutes to 2 hrs, or 30 minutes to 1 hour at a temperature from 15° C. to 50° C., or 15° C. to 30° C. In embodiments, the solvent annealing is carried out by contacting the pellets with solvent using 10 to 100 parts solvent per 100 parts pellets, or 10 to 50 parts solvent per 100 parts pellets (by weight). In embodiments, the polymer is a polyester and solvent is acetone.

In embodiments, the thermal annealing step is carried out at a temperature from the Tg to 10° C. below the Tm, or 70° C. to 200° C., or 80° C. to 190° C., or 80° C. to 180° C., or 80° C. to 170° C., or 90° C. to 160° C., or 100° C. to 150° C., or 120° C. to 150° C., or 130° C. to 150° C. In one embodiment, the thermal annealing step is carried out at a temperature within 10° C. of the $T_{CH}$. In embodiments, the thermal annealing step is carried out for a time sufficient to achieve a dHf within 10% of the maximum dHf obtainable by heating for up to 24 hrs. In embodiments, the thermal annealing step is carried out for a time from 30 minutes to 10 hrs, or 1 hour to 9 hrs, or 2 hrs to 8 hrs. In embodiments, the thermal annealed pellets have a dHf of at least 21 J/g, or at least 22 J/g, or at least 23 J/g, or at least 24 J/g, or at least 25 J/g, or at least 30 J/g, or at least 35 J/g, or at least 40 J/g. In embodiments, the thermal annealed pellets have a dHf from 21 to 40 J/g, or from 22 to 40 J/g, or from 25 to 40 J/g, or from 21 to 35 J/g, or from 22 to 35 J/g, or from 25 to 35 J/g.

As described above, the build compositions are preferably in powder form. As the build composition may include 100% semi-crystalline polymer by volume based on the total volume of the solids fraction of the build composition, the semi-crystalline polymer may be in the form of a powder and the build composition is a semi-crystalline polymer in powder form.

Additional but optional ingredients in the build composition include one or more of crystallizing agents such as nucleating agents; colorants; heat and/or light stabilizers; heat absorbing agents such as heat absorbing inks; anti-oxidants, flow aids, and filler materials such as glass, mineral, carbon fibers and like.

When utilized in an additive manufacturing method such as, for example, a laser sintering process, an important advantage of the build materials of the present invention is that they remain amorphous from the period immediately after being melted/sintered by the laser until they eventually vitrify as they are cooled below the semi-crystalline polymer's glass transition temperature well after the build process is complete. This approach avoids the generation of mechanical stresses caused by crystallization. It also reduces the need for stringent control of temperature gradients across the surface or through the volume of the build. It also enables more of the sintering bed volume to be used and enable scaling up of the sintering bed sizes. It also enables the possibility of not cooling or rapidly cooling the build without the risk of curling or warping of sintered parts. In this regard, the build materials of the present invention address these issues with processing of semi-crystalline polymers and still maintain the advantage of being amorphous after being sintered.

Accordingly, in one aspect, an additive manufacturing method for producing a three-dimensional object is provided, said method including the steps of:

(a) applying a layer of a build material onto a target surface, the build material including a build composition in powder form that includes a semi-crystalline polymer;

(b) directing electromagnetic wave energy at selected locations of the layer corresponding to a cross-section of a part to be formed in said layer to sinter the build composition at the selected locations; and (c) repeating said applying and directing steps to form the part in layerwise fashion; wherein each applying and directing step is much shorter than the minimum crystallization half-time.

As noted above, additive manufacturing methods, and in particular laser sintering processes, are generally known in the art and described for example in laser sintering U.S. Pat. Nos. 6,100,411; 5,990,268 and 8,114,334, the descriptions and disclosure of which are hereby incorporated herein by reference. An important and unexpected advantage of the method of the present invention is that the prior art's requirement of meticulous monitoring and control of the target surface and build environment temperature to avoid later and/or part warping is substantially reduced. Accordingly, the temperature of the part bed in the method of the present invention may vary more than 5° C. over the said total time period for all the applying and directing steps.

In embodiments, the additive manufacturing process can be a high-speed sintering (HSS) process. In embodiments, the HSS process can include the steps of:

(a) depositing a layer of (a build material) powder on a print bed;

(b) printing areas to be sintered with a radiation absorbent material (RAM); and (c) exposing at least the printed areas to be sintered with an energy source, e.g., infra-red (IR) light, sufficient to be absorbed by the RAM and to sinter the build material underneath the RAM.

In embodiments, a roller assembly deposits a layer of the powder on the print bed. In embodiments, the layer of powder is heated (before or after being deposited) to a temperature below the onset melting temperature. In embodiments, the RAM is an ink, capable of absorbing a specific form or energy such as infrared light, that is printed on the areas to be sintered. In embodiments, print heads can jet bitmap images onto the bed using the RAM. In embodiments, energy (from the energy source) gets absorbed by the RAM, e.g., ink, heating the powder underneath it to above $T_m$ and sintering the powder to a solid layer. In embodiments, an Infra-Red (IR) source, e.g., lamp, exposes the entire print bed to IR energy, which causes the material to selectively melt and fuse together. In embodiments, the exposure of IR energy can be at the same time the RAM is being printed.

In embodiments, the unprinted areas in the print bed remain a powder. The part (being formed layer by layer) can be lowered with the print bed and a next layer of powder can be spread onto the part and print bed, and the process repeated until the print is completed. Final sintered parts can then be removed from the powder bed.

In another aspect, the present invention is directed to a polymer article formed via an additive manufacturing process, referred to herein as an additive-manufactured polymer article. An important feature of the present invention resides in the fact that the polymer of an additive-manufactured polymer article formed from the build material of the present invention is amorphous.

In another aspect, printed articles made using the semi-crystalline polymers (described herein) and methods for making same are provided.

In embodiments, the semi-crystalline polymers (described herein) can be used to 3D print dental aligner thermoform molds (or arches) that can be used as molds to thermoform dental aligners using sheet material. In embodiments, the sheet material is clear. In embodiments, the dental aligner thermoform molds are printed by SLS-AM or HSS as described herein. In embodiments, dental aligners are prepared by a method that comprises: (i) taking a digital scan of a person in need of teeth alignment; (ii) calculating the different aligner shapes needed for that person; (iii) 3D printing thermoform molds (or arches) for the different aligners using one or more of the semi-crystalline polymers described herein; and (iv) using the molds to thermoform the different aligners with a sheet material in a thermoforming process, e.g., vacuum forming.

In embodiments, the semi-crystalline polymers (described herein) can be used to directly 3D print dental aligners, without the need to print thermoform molds, thus avoiding the thermoforming step described above. In embodiments, dental aligners are prepared by a method that comprises: (i) taking a digital scan of a person in need of teeth alignment; (ii) calculating the different aligner shapes needed for that person; (iii) 3D printing the different aligners using one or more of the semi-crystalline polymers described herein. In embodiments, the dental aligners can be subjected to post treatment processes to modify surface properties. In embodiments, such post treatments can include one or more of: flame treating the surface to improve surface smoothness or aligner visual clarity; impregnating the printed aligners with a chemical compound or resin to improve surface smoothness or aligner visual clarity; decorating the surface of the aligner with indicia or designs, e.g., by printing or applying a decorative film of sheet; or over-coating the dental aligner with a liquid coating or film to change surface properties. In embodiments, the over-coating can include coating or laminating the surface of the aligner with another polymer or elastomeric material, e.g., silicone or polyurethane. In embodiments, the over-coating can provide a softer feel for the cheeks, lips and gums.

EXAMPLES

The following examples set forth suitable and/or preferred methods and results in accordance with the invention. It is to be understood, however, that these examples are provided by way of illustration and nothing therein should be taken as a limitation upon the overall scope of the invention. Copolyesters in the below examples were manufactured via hydrolytic polycondensation according to standard methods. By way of background, copolyesters typically comprise one or more diacids and one or more diols. The total number of moles of the all the diacids is equal to the total number of moles of all the diols.

In the examples below, bulk pellets of commercial copolyesters were obtained and their compositions and physical properties are listed below in table 1.

TABLE 1

Composition, Tm and Tg of copolyesters

| | Sample | | | |
|---|---|---|---|---|
| | Polymer 1 | Polymer 2 | Polymer 3 | Polymer 4 |
| Copolymer Type | PCTA | PETG | PETM | PCTG/PETG |
| Composition | 48 Mole % IPA in PCT | 20 mole % CHDM in PET | 23 mole % TMCD in PET | 50 mole % CHDM in PET |
| IV | 0.65 | 0.76 | 0.65 | 0.59 |
| Tm (° C.) | 187 | 197 | 191 | 180 |
| Tg (° C.) | 85 | 80 | 93 | 84 |

Analysis Methods

Differential Scanning calorimetry was performed at a rate of 20° C./min.

Crystalline content is defined as the heat of fusion, ΔHf or dHf.

Example 1: Crystallization of Polymer 1

Polymer 1 had a crystalline melting temperature of 187° C. The amount of acetone needed to promote solvent crystallization was investigated. 100 grams of Polymer 1 pellets were placed in a jar. A sufficient amount of acetone solvent was poured into the jar to completely cover the pellets. The pellets were allowed to soak in the solvent for approximately 24 hours. Then, the solvent was drained and air dried in ambient conditions for 24 hours. The solvent exposure was repeated using increasing amounts of acetone measured as parts acetone per 100 parts total (of pellets and acetone (by weight). The results are shown in Table 2 below.

TABLE 2 dHf after 24 hours of acetone exposure as a function of acetone quantity.

| Acetone % (parts/100) | ΔHf (J/g) |
|---|---|
| 10 | 9 |
| 20 | 10.5 |
| 30 | 11 |
| 40 | 9.5 |

TABLE 2-continued dHf after 24 hours of acetone exposure as a function of acetone quantity.

| Acetone % (parts/100) | ΔHf (J/g) |
|---|---|
| 50 | 11.5 |
| 60 | 8.5 |
| 70 | 9.5 |
| 80 | 10 |
| 90 | 9.5 |
| 100 | 11 |

A review of Table 2 reveals that there was not a significant change in crystallization above 10 wt % acetone. This allows processing freedom with respect to acetone quantities used to solvent crystallize the shell of the pellets.

Solvent crystallization of the (pellet) core as a function of time was also investigated. 50 grams of Polymer 1 pellets was exposed to 10 parts acetone and 5 gram samples were removed every hour for 8 hours, as well as after 16 and 20 hours. Table 3 shows the dHf as a function of acetone exposure time.

TABLE 3 dHf as a function of exposure time.

| Exposure Time (Hrs) | ΔHf (J/g) |
|---|---|
| 1 | 7 |
| 2 | 6 |
| 3 | 8 |
| 4 | 7.5 |
| 5 | 8 |
| 6 | 9.5 |
| 7 | 10.5 |
| 8 | 7 |
| 16 | 10.5 |
| 20 | 14 |

A review of Table 3 suggests that a shell forms on the pellet surface after one hour of exposure. It is believed that solvent exposure leads to less defined crystal formation and this experiment was conducted to determine the time required to form a thin skin of solvent crystallized material on the surface of the pellet. The results suggest that exposure of one hour was sufficient to form such a thin shell.

Thermal annealing was investigated to determine the minimum time required to thermally anneal the center core of a pellet after solvent annealing with 50% acetone for one hour to form a solvent crystallized shell and overnight air drying. Table 4 shows dHf as a function of time at 140° C. (Bake Time), the temperature of crystallization upon cooling, $T_{CC}$. Table 5 shows the reproducibility of this data from two samples where the reported data is the average of the two sample runs.

TABLE 4

Polymer 1 melting dHf as a function of drying (Bake) time

| Bake Time (Hrs) | ΔHf (J/g) |
|---|---|
| 1 | 6 |
| 2 | 9 |
| 3 | 11 |
| 4 | 13.5 |
| 5 | 16.5 |
| 6 | 17.5 |
| 7 | 16.5 |
| 8 | 17.5 |
| 16 | 19 |
| 20 | 15.5 |

TABLE 5

Average of two runs for Polymer 1 dHf as function of drying (Bake) time

| Bake Time (Hrs) | ΔHf (J/g) |
|---|---|
| 0 | 6.5 |
| 1 | 7.5 |
| 2 | 8.5 |
| 3 | 12 |
| 4 | 13 |
| 5 | 14 |
| 6 | 16.5 |
| 7 | 16.5 |
| 8 | 17.5 |

Parts were printed using a laser sintering process using Polymer 1 pellets that were manufactured using one-hour acetone exposure followed by drying (thermal annealing) at 140° C. for 8 hours. The thermally annealed pellets were ground into a powder having a particle size of about 80 microns and printed using EOS sinterstation. The printed parts provided high resolution prints, the parts were brittle.

Figure 4:
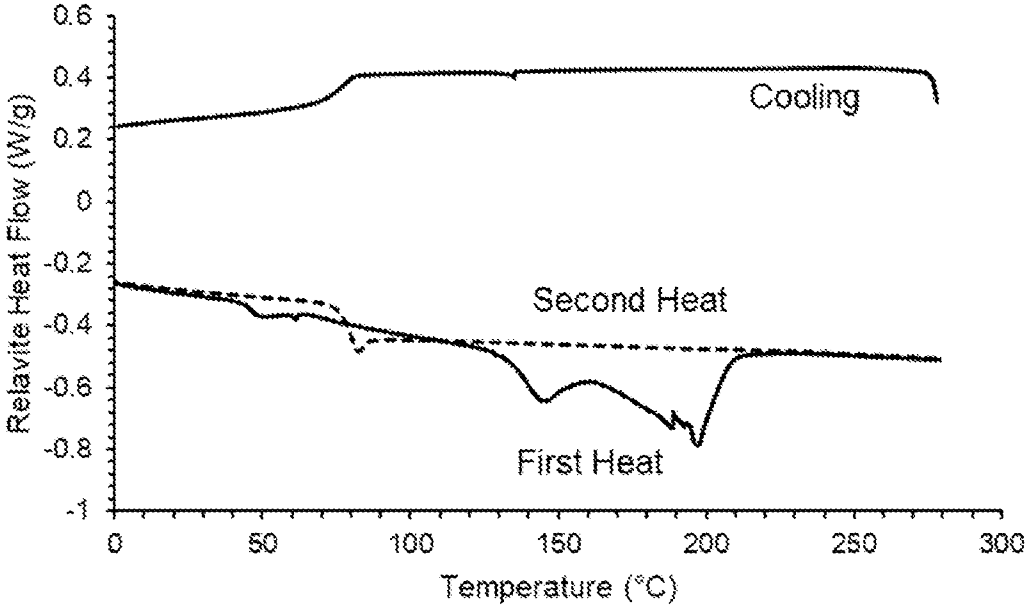
FIG. 4 is a graph showing DSC heat-cool-heat thermograms of solvent and thermally annealed polymer powder.

The melting characteristics of the Polymer 1 powder was also evaluated using DSC heating and cooling and plotting the DSC heat-cool-heat thermograms. FIG. 4 shows the DSC heat-cool-heat thermograms of solvent and thermally annealed Polymer 1 powder.

A review of FIG. 4 reveals that the powder used for molding shows amorphous return behavior where the first heat shows melting of crystalline domains without the recrystallization upon cooling and an amorphous second heat thermogram.

Example 2: Crystallization of Polymer 4

Similar to Example 1, the amount of acetone required to crystallize bulk pellets of Polymer 4 was determined to be less than ten parts. Similar to Polymer 1 (as shown in Table 2), the heat of fusion as a function of % acetone for Polymer 4 did not have a marked gain in crystallinity above 10 parts acetone. At 10 parts acetone, the dHF was about 11 J/g and it remained in a range from about 9 to less than 14 as the amount of acetone was increased up to 100 parts.

The time dependence of acetone crystallization was also evaluated for Polymer 4 by exposing the polymer pellets to 10 parts acetone and evaluating samples at hours 1-8, 16 and 20. It was found that one hour of exposure produced a thin crystalline layer with a dHf of 4 J/g. Thus, exposure to acetone for one hour was sufficient to form a thin solvent crystalline shell.

Crystallization of the amorphous core of the Polymer 4 pellets having a solvent crystalline shell was analyzed as a function of time in an oven at 140° C. The polymer reached a plateau of about 9 J/g after 8 hours. The results further show that Polymer 4 does not have attractive properties for SLS additive manufacturing as the dHf is not sufficiently high to drop into existing PA12 printers (that are configured for printing nylon12 powder).

Example 3: Crystallization of Polymer 2

Figure 5:
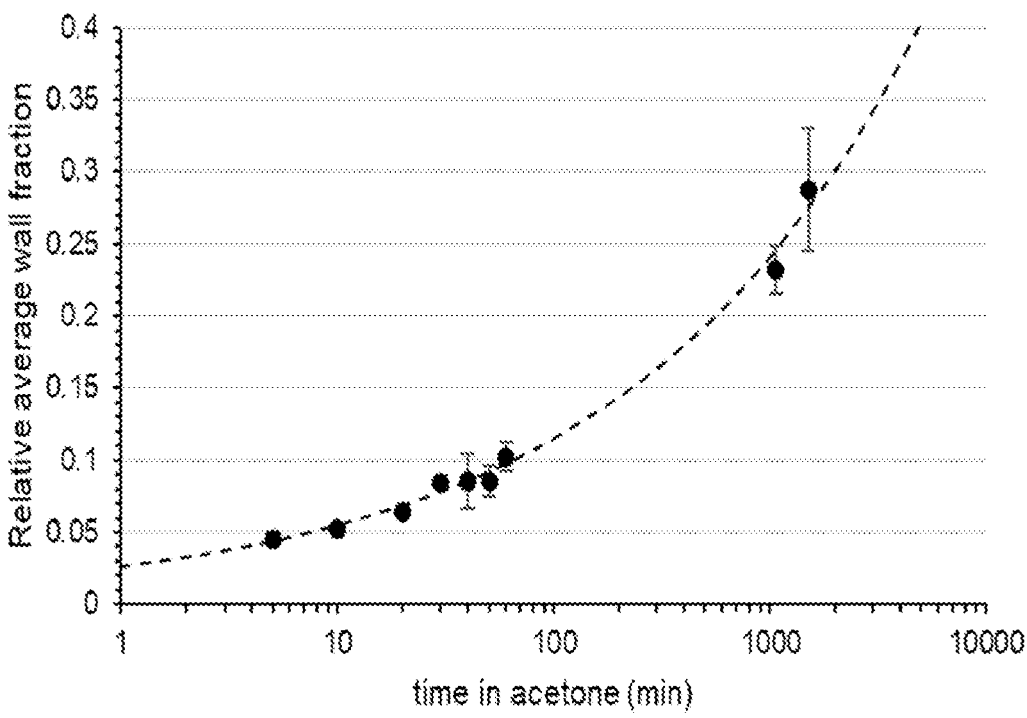
FIG. 5 is a graph showing relative average wall thickness of a crystalline shell of a polymer as a function of time of exposure to acetone.

Similar to Examples 1 and 2, Polymer 2 was analyzed for crystallization as a function of time. It was found that Polymer 2 crystallizes much faster than Polymer 1 and Polymer 4. A significant crystalline shell was developed within 5 minutes when exposed to acetone. An increasing thickness of a crystalline shell was visually observed as a function of time, when examining a cross section of the pellets after 5, 10, 40 50 and 1063 minutes. FIG. 5 shows a plot of the development of the crystalline shell as a function of time.

A review of FIG. 5 reveals that one hour of exposure of polymer 2 pellets in acetone yielded a dHf of 19.03 J/g, which was a significantly higher dHf compared to Polymer 1 and Polymer 4. The time dependence of thermal crystallization of Polymer 2 pellets at 140° C. that were previously solvent annealed in acetone for one hour was also studied.

It was found that thermal crystallization of the solvent annealed Polymer 2 pellets was complete after one hour of exposure to 140° C. and resulted in a dHf of at least 35 J/g. The dHf remained in a range from about 35 to 37 J/g after exposure times of 2 to 6, 22 and 24 hours. This shows that Polymer 2 is a good candidate for being a viable PA12 replacement in laser sintering additive manufacturing, as PA12 has a dHf of 32 J/g.

Example 4: Crystallization of Polymer 3

Solvent crystallization of Polymer 3 as a function of time was investigated. 50 grams of Polymer 3 pellets was exposed to 10 parts acetone. The pellets were found to be swollen and stuck together and did not crystalize. As a result, Polymer 3 was determined to not be a good candidate for making an additive manufacturing powder using the solvent and thermal annealing processes described herein.

Example 5: Crystallization of Higher Tg Copolyesters

Some commercial copolyesters were investigated to determine applicability for high temperature laser sintering applications. The thermal properties of three grades (available from Eastman Chemical Company) are shown in Table 6.

TABLE 6

| Higher Tg copolyester properties. | | | | |
|---|---|---|---|---|
| | Tg | Tm | Tm-Tg | FCH |
| TX1000 | 106 | 246 | 140 | 22 |
| TX1500HF | 104 | 246 | 142 | 19 |
| TX2000 | 119 | 217 | 98 | 595 |

50 gram samples of each grade of TX1000, TX1500HF and TX2000 copolyester pellets were soaked in acetone for 24 hours with 5 gram samples removed after one hour and five hours. All samples were analyzed for crystalline content. The results are shown in FIG. 6.

Figure 6:
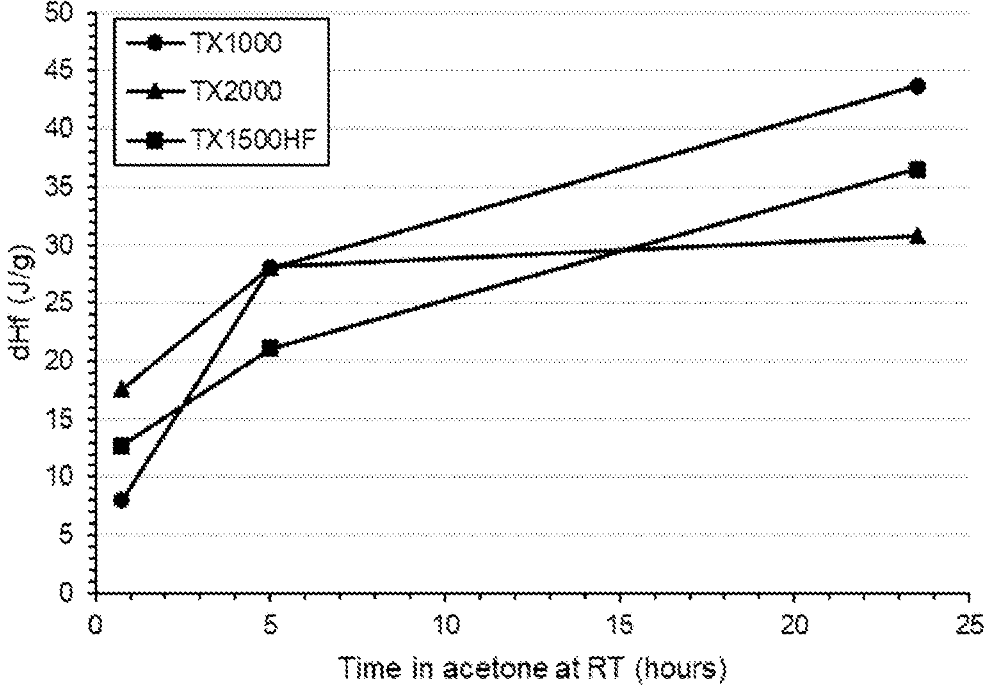
FIG. 6 is a graph showing copolyester dHf as a function of time in acetone.

A review of FIG. 6 reveals that some crystalline content was acquired after one hour and that one-hour exposure time could be used for initiating crystallization.

Injection molded flex bars having dimensions of L=5 inches×W=0.5 inches×T=0.125 inches were made from each of TX1000 and TX2000 pellets (that were not exposed to solvent), respectively. The flex bars were then exposed to acetone to allow for visualization of the acetone induced changes. Each bar was cut and viewed on end to show the surface effects. A review of the cut ends of the TX1000 and TX2000 bars showed that each had a distinct crystalline layer on the exterior shell and an amorphous core.

50 gram samples of each grade of TX1000, TX1500HF and TX2000 copolyester pellets were soaked in acetone for 1 hour and then were placed in a 170° C. oven for 24 hours with samples being removed at intervals over 24 hours. DSC was used to determine crystalline content during the first heat. The results are shown in FIG. 7.

Figure 7:
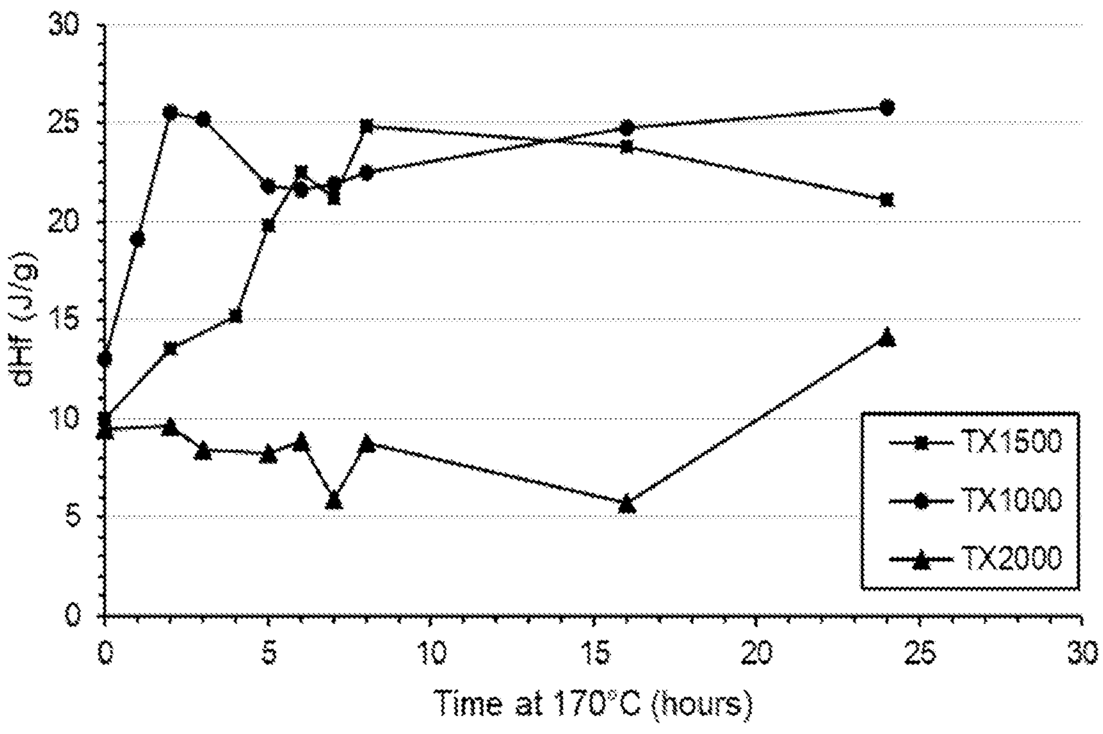
FIG. 7 is graph showing heat of fusion as a function of time at 170° C. for copolyester samples.

A review of FIG. 7 reveals that TX2000 did not thermally anneal beyond the initial acetone induced crystallization. This was also apparent in the flex bar as the core of the bar remained transparent. Based on this, it appears that TX2000 did not meet the requirements of dHf and crystallinity required for laser sinter printing. TX1000 and TX1500HF increased in crystallization content as a function of thermal annealing time and plateaued after about 8 hours.

Figure 8:
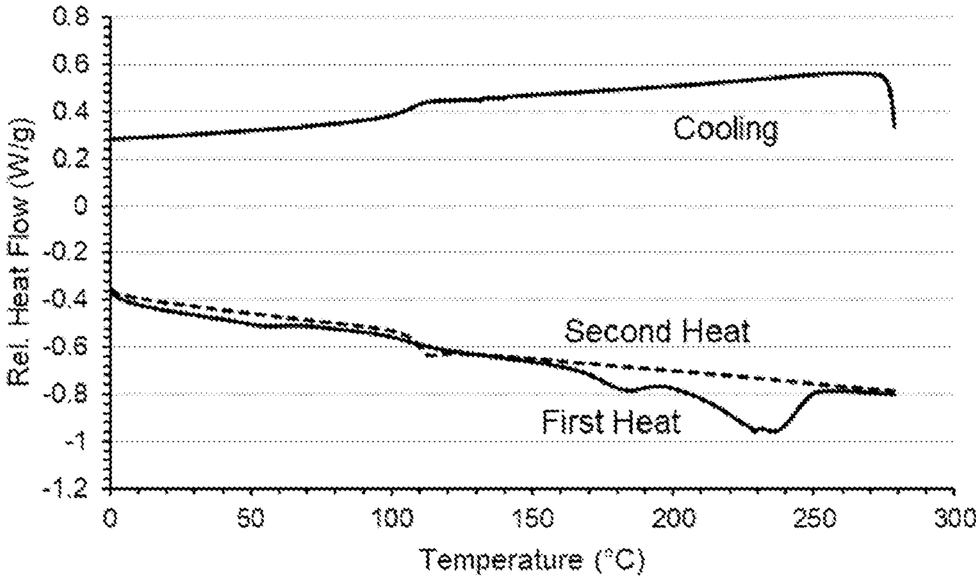
FIG. 8 is graph showing a crystallized copolyester DSC heat-cool-heat thermograms.

The melting characteristics of TX1000 powder was also evaluated using DSC heating and cooling and plotting the DSC heat-cool-heat thermograms. The powder was formed from crystallized (initial solvent crystallized shell and then thermal crystallized) pellets that were cryogenically ground to a sub 100 micron particle size (as described herein). FIG. 8 shows the DSC heat-cool-heat thermograms of solvent and thermally annealed TX1000 powder.

A review of FIG. 8 reveals that TX1000 displays amorphous return behavior where induced crystallinity does not return upon cooling at 20° C./min, as well as an amorphous second heat thermogram. TX1000 yields the behavior that would allow for laser sintering in a high temperature SLS printer due to the high dHf and the minimal transition at the glass transition temperature. The TX1000 powder (described herein) was also successfully printed on a PA12 centric printer using typical PA12 conditions.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A build material for additive manufacturing comprising a build composition in powder form, said build composition comprising a semi-crystalline polymer having a glass transition temperature (Tg) of at least 70° C., an onset melting temperature of at least 125° C., a Tm of at least 170° C., and a dHf of at least 21 J/g, all measured using differential scanning calorimeter (DSC) with a heating rate of 20° C./min, wherein the semi-crystalline polymer is a crystallized amorphous polymer that exhibits an amorphous return determined by subjecting the crystallized amorphous polymer to a DSC heat-cool-heat cycle performed at a heating and cooling rate of 20° C./min and plotting a DSC heat-cool-heat thermogram having a DSC first heat curve, a DSC cooling curve, and a DSC second heat curve, wherein the first heat curve shows a crystalline melting endotherm, the cooling curve does not show recrystallization upon cooling below the Tg, and the second heat curve is amorphous, wherein the crystalline melting endotherm is determined by a DSC curve showing a heat of fusion (dHf) of 2 J/g or more and amorphous is determined by a DSC curve showing a heat of fusion (dHf) of less than 2 J/g, wherein the Tg is measured via DSC according to ASTM E1356-08 (2014) and wherein the Tm is the highest temperature of an endothermic peak apex on the DSC first heat curve.

2. The build material according to claim 1, wherein said semi-crystalline polymer is a polyester or copolyester.

3. The build material according to claim 2, further comprising one or more additives chosen from crystallizing agents; colorants; heat stabilizers; light stabilizers; heat absorbing agents; anti-oxidants, flow aids, and filler materials.

4. The build material according to claim 2, wherein said build composition in powder form is present in said build material in an amount of from 40 to 100 volume percent of said build material based on the total volume of the solids fraction of said build material.

5. The build material according to claim 2, wherein the semi-crystalline polymer has a glass transition temperature from 70° C. to 200° C., an onset melting temperature from 125° C. to 10° C. below the Tm, a Tm from 170° C. to 275° C., and a dHf from 21 J/g to 40 J/g.

6. The build material according to claim 5, wherein the semi-crystalline polymer has an onset melting temperature from 125° C. to 180° C.

7. The build material according to claim 6, wherein the semi-crystalline polymer has a Tm from 170° C. to 225° C.

8. The build material according to claim 7, wherein the semi-crystalline polymer has a dHf from 21 J/g to 40 J/g.

9. A semi-crystalline polymer useful in additive manufacturing, said polymer having a glass transition temperature of at least 70° C., an onset melting temperature of at least 125° C., a Tm or at least 170° C., and a dHf of at least 21 J/g, all measured using differential scanning calorimeter (DSC) with a heating rate of 20° C./min, wherein the semi-crystalline polymer is a crystallized amorphous polymer that exhibits an amorphous return determined by subjecting the crystallized amorphous polymer to a DSC heat-cool-heat cycle performed at a heating and cooling rate of 20° C./min and plotting a DSC heat-cool-heat thermogram having a DSC first heat curve, a DSC cooling curve, and a DSC second heat curve, wherein the first heat curve shows a crystalline melting endotherm, the cooling curve does not show recrystallization upon cooling below the Tg, and the second heat curve is amorphous, wherein the crystalline melting endotherm is determined by a DSC curve showing a heat of fusion (dHf) of 2 J/g or more and amorphous is determined by a DSC curve showing a heat of fusion (dHf) of less than 2 J/g, wherein the Tg is measured via DSC according to ASTM E1356-08 (2014) and wherein the Tm is the highest temperature of an endothermic peak apex on the DSC first heat curve.

10. The semi-crystalline polymer according to claim 9 wherein said polymer is in the form of a powder.

11. The semi-crystalline polymer according to claim 9, wherein the polymer is a polyester or copolyester.

12. A method for making an additive manufacturing polymer, said method comprising the steps of:

(a) providing a bulk of amorphous polymer pellets;

(b) solvent annealing said bulk of amorphous polymer pellets under conditions to provide a partially solvent annealed bulk of polymer pellets, wherein said pellets have a glass transition temperature (Tg) of at least 70° C. and a melting temperature (Tm) of at least 170° C., and have an amorphous center and a semi-crystalline shell sufficient to prevent the pellets from sticking in a thermal annealing process; and (c) thermally annealing said partially solvent annealed bulk of polymer pellets under conditions to provide a crystallized amorphous polymer in the form of a thermally annealed bulk of polymer pellets, wherein said pellets have a semi-crystalline center and a semi-crystalline shell; and wherein said thermally annealed polymer has a dHf of at least 21 J/g, measured using differential scanning calorimeter (DSC) with a heating rate of 20° C./min, and exhibits an amorphous return determined by subjecting the crystallized amorphous polymer to a DSC heat-cool-heat cycle performed at a heating and cooling rate of 20° C./min and plotting a DSC heat-cool-heat thermogram having a DSC first heat curve, a DSC cooling curve, and a DSC second heat curve, wherein the first heat curve shows a crystalline melting endotherm, the cooling curve does not show recrystallization upon cooling below the Tg, and the second heat curve is amorphous, wherein the crystalline melting endotherm is determined by a DSC curve showing a heat of fusion (dHf) of 2 J/g or more and amorphous is determined by a DSC curve showing a heat of fusion (dHf) of less than 2 J/g, wherein the Tg is measured via DSC according to ASTM E1356-08 (2014) and wherein the Tm is the highest temperature of an endothermic peak apex on the DSC first heat curve.

13. The method according to claim 12, wherein said amorphous polymer is a copolyester and said amorphous polymer pellets have a Tg of at least 70° C.

14. The method according to claim 12, wherein the crystalline shell has a thickness of 15% or less of the pellet diameter.

15. The method according to claim 14, wherein the solvent annealing step comprises exposing the amorphous polymer pellets to a solvent suitable to form a crystalline shell for 0.25 to 2 hours at room temperature.

16. The method according to claim 15, wherein the polymer is a copolyester and the solvent is a 10 to 100 wt % acetone solution in water.

17. The method according to claim 14, wherein the solvent annealed polymer pellets have a dHF from 3 J/g to 20 J/g.

18. The method according to claim 14, wherein the thermal annealing step comprises exposing the solvent annealed polymer pellets to a temperature from the Tg of the solvent annealed polymer to 10° C. below the Tm of the solvent annealed polymer for a time sufficient to increase the dHf of the polymer by at least 25% (in J/g).

19. The method according to claim 18, wherein the polymer is a copolyester and the thermal annealing step comprises exposing the solvent annealed polymer pellets to a temperature from 140° C. to 190° C. for 0.5 to 10 hours.

20. The method according to claim 19, wherein the solvent annealed pellets have a dHf from 10% to 60% of the dHf of the thermal annealed pellets (in J/g).

* * * * *